(12) United States Patent
Malladi et al.

(10) Patent No.: US 8,150,367 B1
(45) Date of Patent: Apr. 3, 2012

(54) SYSTEM AND METHOD OF DETERMINING A LOCATION BASED ON LOCATION OF DETECTED SIGNALS

(75) Inventors: Venkata Sastry Malladi, San Jose, CA (US); Arunesh Mishra, Sunnyvale, CA (US); Zhengrong Ji, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 401 days.

(21) Appl. No.: 12/570,325

(22) Filed: Sep. 30, 2009

(51) Int. Cl.
*H04M 11/04* (2006.01)

(52) U.S. Cl. ............... 455/404.2; 455/456.1; 455/456.3; 455/566; 455/414.2

(58) Field of Classification Search .............. 455/404.2, 455/456.1, 456.3, 566, 412.2
See application file for complete search history.

(56) References Cited

U.S. PATENT DOCUMENTS 7,006,838 B2 * 2/2006 Diener et al. .............. 455/456.1
7,761,890 B1 * 7/2010 Harvey et al. .............. 725/38

OTHER PUBLICATIONS

"Cell of Origin" [online]. [Retrieved Sep. 12, 2009]. Retrieved from the internet: <http://en.wikipedia.org/wiki/cell_of_origin_(telecommunications), 1 page.
"Mobile Phone Tracking" [online]. [Retrieved Sep. 12, 2009]. Retrieved from the internet: <http://en.wikipedia.org/wiki/Mobile_phone_tracking, 5 pages.
"New Magical Blue Circle on Your Map" [online]. [Retrieved Sep. 12, 2009]. Retrieved from the internet: <http://googlemobile.blogspot.com/2007/11/new-magical-blue-circle-on-your-map.html., 26 pages.
"Using GPS and My Location (beta): My Location (beta)" [online]. [Retrieved Sep. 12, 2009]. Retrieved from the internet: <http://google.com/support/mobile/bin/answer/>, 1 page.

* cited by examiner

*Primary Examiner* — Nghi Ly
(74) *Attorney, Agent, or Firm* — Lerner, David, Littenberg, Krumholz & Mentlik, LLP

(57) ABSTRACT

A system and method is provided that allows a client device to determine its position based on the location of signals detected by the device. The signals' locations may be obtained from a server, and some of the information may be pre-fetched and sent to the client device before the client device detect the signals. The pre-fetched data may also be encrypted so that a client device cannot determine the location of a signal unless it is proximate to the signal.

39 Claims, 14 Drawing Sheets

SYSTEM AND METHOD OF DETERMINING A LOCATION BASED ON LOCATION OF DETECTED SIGNALS

BACKGROUND OF THE INVENTION

Programs are available that permit cell phones lacking GPS capability to detect and display the approximate location of the phone on a map. By way of example, if the program is active and the phone is communicating with a cell tower, the phone transmits the cell tower's ID to a server. If the geographic location of the cell tower is known to the server, the server transmits the location to the program installed on the phone. The program, in turn, shows the location of the phone on a map based on the received location. The program may transmit more than one signal to the server. Even if the server computes and suggests an estimated position, the client device may use the locations provided by the server to estimate its own position.

In systems heretofore, the location has been similarly computed based on the phone's detection of multiple WiFi signals. Clustering algorithms, such as determining the centroid of the multiple locations of the multiple signals, have been used to estimate the location of the device.

BRIEF SUMMARY OF THE INVENTION

In one aspect, a method is provided that includes detecting a first signal at a device when the device is at a first location. The method further includes receiving, based on an identifier of the first signal (such as by sending the identifier to a server and receiving data in response), second signal data and a second location associated with the second signal data. Another signal at the device is received when the device moves from the first location to another location. The second signal data is compared with data based on an identifier of the other signal, a device location associated with the device is determined based on the comparison (such as a program assuming the location of the device is equal to the second location if the detected identifier matches the second signal data that was received), and information based on the determined device location is displayed on an electronic display associated with the device.

Another aspect provides a method that includes: receiving, via a network and from a device (e.g., receiving at a server), a first identifier of a radio signal; selecting, with a processor and based on the first identifier, a first location from among identifier/location data (e.g., a database of records that individually associate a location with the identifier of a radio signal broadcasting from or within the range of the location); selecting additional locations and their associated identifiers from the identifier/location data based on each location's proximity to the first location; and providing, via the network and to the device, the first location, the additional identifiers and the locations associated with the additional identifiers without waiting to receive the additional identifiers from the device.

Still another aspect relates to a method that includes: detecting a first signal identifier at a device when the device is at a first location; receiving, based on the first signal identifier, a second value and a second location associated with the second value, the second value being based on an identifier of a second signal; detecting another signal identifier at the device when the device moves from the first location to another location; calculating, with a processor, an encrypted value based on a function that accepts the signal identifier of the other signal as a parameter; determining the device's location based on the second location when the encrypted value corresponds with the second value; and displaying, on an electronic display associated with the device, information based on the determined device location. The encryption function may be a one-way cryptographic function such as SHA-1.

In a further aspect, a device includes a processor, a display displaying data processed by the processor in accordance with the instructions, and a medium storing instructions operable by the processor. The instructions include: detecting a first signal at the device when the device is at a first location; receiving, based on an identifier of the first signal, second signal data and a second location associated with the second signal data; detecting another signal at the device when the device moves from the first location to another location; comparing the second signal data with data based on an identifier of the other signal; determining a device location associated with the device based on the comparison; and displaying, on an electronic display associated with the device, information based on the determined device location.

A system in accordance with one aspect includes a first computer at a first node of a network and a mobile client device at a second node of the network different from the first node. The first computer has access to instructions operable by the first computer, identifier data based on information broadcast by a number of radio transmissions, and location data representing geographic locations. The identifier data of each radio transmission is associated with a geographic location. The client device includes an electronic display, a processor and instructions operable by the processor. The instructions of the client device relate to: detecting a first radio transmission when the device is within range of the first radio transmission; providing, to the first computer, first identifier data based on the first radio transmission; receiving, from the first computer and in response to the first identifier data, first location data representing a first geographic location; receiving, from the first computer and in response to the first identifier data, second location data representing a second geographic location different from the first geographic location and second identifier data different from the first identifier data; detecting a second radio transmission when the device is within range of the second radio transmission; displaying, on the electronic display, information based on the first geographic location when the device is within range of and detects the first radio transmission; and displaying, on the electronic display, information based on the second geographic location when both (i) the device is within range of and detects the second radio transmission and (ii) the second identifier data corresponds with an identifier of the detected second radio transmission. The instructions of the first computer relate to: receiving the first identifier data; selecting and providing the first location data based on the location data that is associated with the first identifier data; selecting and providing the second location data based on the proximity of the second geographic location to the first geographic location; and selecting and providing the second identifier data based on the identifier data that is associated with the second location data.

Yet a further aspect relates to a computer-usable medium including a program executable by a processor: computer code that detects a first signal at a device when the device is at a first location; computer code that receives, based on an identifier of the first signal, second signal data and a second location associated with the second signal data; computer code that detects another signal at the device when the device moves from the first location to another location; computer code that compares the second signal data with data based on an identifier of said another signal; computer code that determines a device location associated with the device based on the comparison; and computer code displays, on an electronic display associated with the device, information based on the determined device location.

DETAILED DESCRIPTION

In one aspect, a system and method is provided wherein the identity and location of nearby radio signals (such as WiFi signals) are pre-fetched by a mobile phone or other client device before the phone comes within range of the radio signals. When the phone detects the presence of a radio signal, it may avoid the delay of obtaining the location of the radio signal from a server if the signal's identity and location is among the pre-fetched data stored on the phone. The phone may use the signal's location to estimate the location of the phone.

The pre-fetched data may be encrypted in order to mitigate the likelihood that entities fetch the data for unauthorized purposes. By way of example only, the server may encrypt a pre-fetched signal's identity using information that would only be available if the phone was near the signal (such as the MAC address of a WiFi signal). The pre-fetched signal's encrypted identity, as well as its location, are then provided to the phone. If the phone later detects a signal, the phone may similarly encrypt the signal's identity. If the phone finds a match between the encrypted signal data received from the server and the encrypted signal data computed by the phone, the phone may use the location provided by the server to estimate the phone's location.

Figure 1:
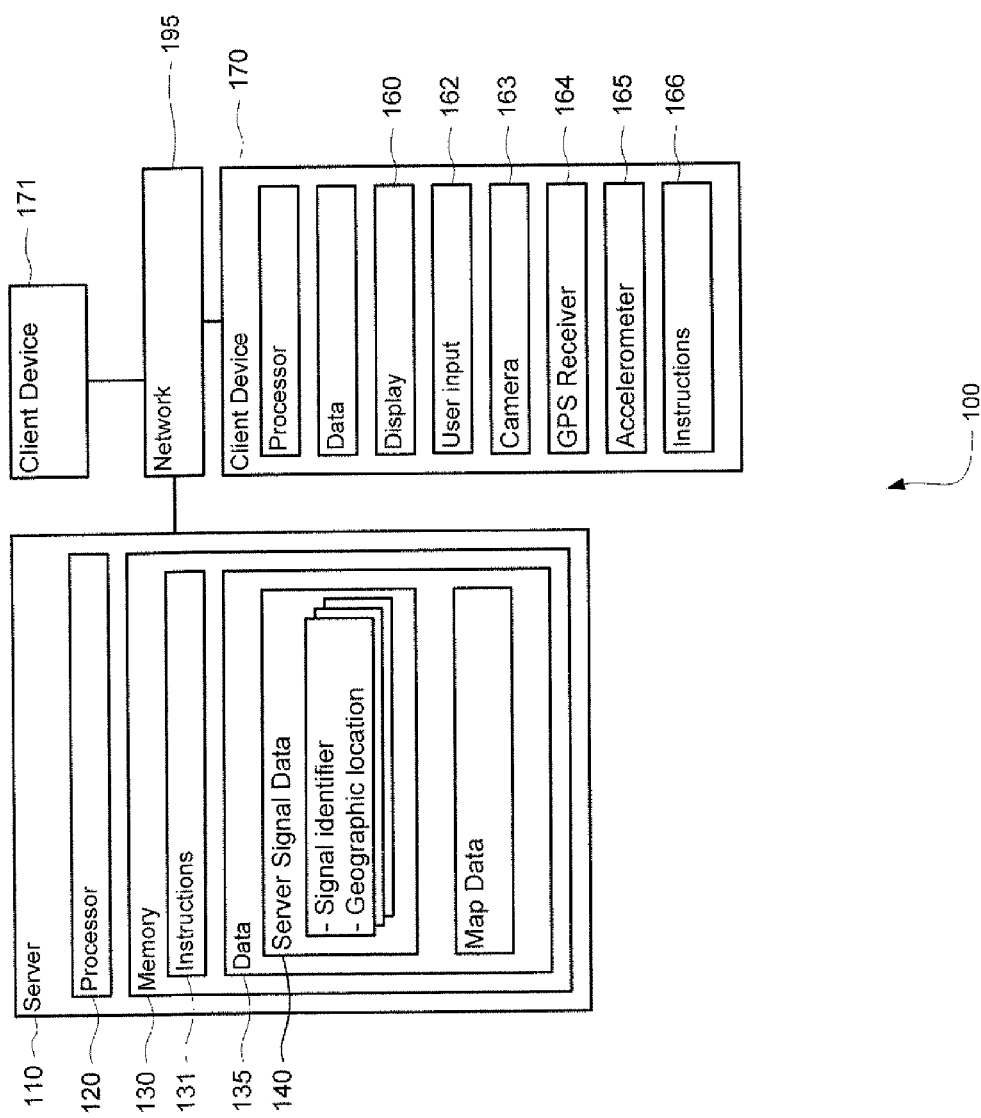
FIG. 1 is a functional diagram of a system in accordance with an aspect of the system and method.
Figure 2:
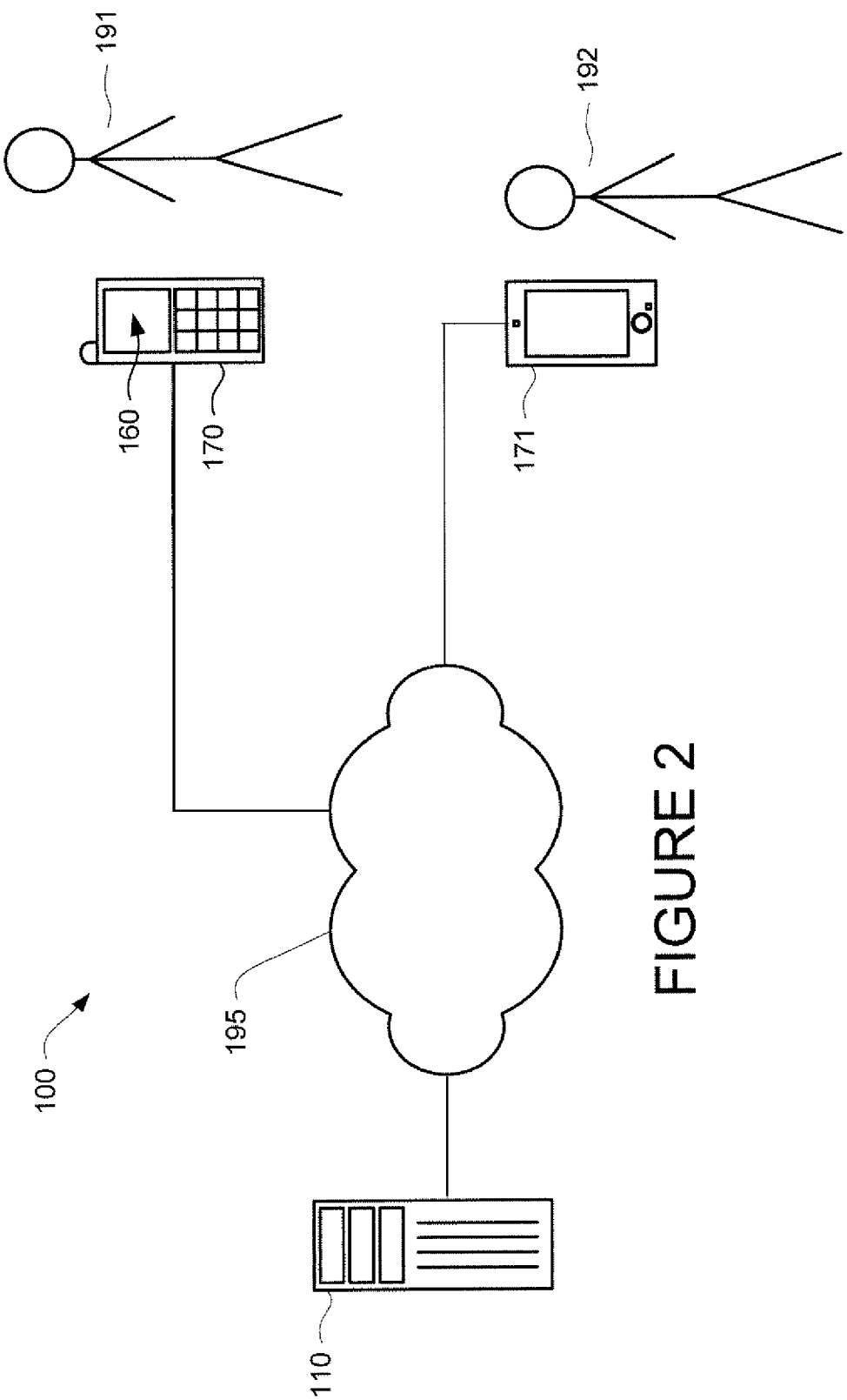
FIG. 2 is a pictorial diagram of a system in accordance with an aspect of the system and method.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120 and data 135. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. The system and method may include different combinations of the foregoing, whereby different portions of the instructions and data are stored on different types of media.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any well-known processor, such as processors from Intel Corporation or AMD. Alternatively, the processor may be a dedicated controller such as an ASIC.

Although FIG. 1 functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors, computers or memories that may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display 160 of client device 170. Server 110 may also comprise a plurality of computers that exchange information with different nodes of a network for the purpose of receiving, processing and transmitting data to the client devices; in this instance, the client devices will typically still be at different nodes of a network than any of the computers comprising server 110.

Network 195, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few devices are depicted in FIGS. 1-2, it should be appreciated that a typical system can include a large number of connected computers.

Each client device may be configured similarly to the server 110, with a processor, memory and instructions. Each client device 170-71 may be a mobile phone capable of wirelessly exchanging data with a server over a network such as the Internet and intended for use by a person 190-191. It may have all of the components normally used in connection with a wireless mobile device such as a central processing unit (CPU), memory (e.g., RAM and ROM) storing data and instructions, an electronic display 160 (e.g., an LCD screen or touch-screen), user input 162 (e.g., a keyboard, touch-screen or microphone), camera 163, a speaker, a network interface component, and all of the components used for connecting these elements to one another. Some or all of these components may be internally stored within the same housing, e.g., a housing defined by a plastic shell and LCD screen.

Although the client devices 170-71 may comprise a mobile phone, the client device may also comprise a personal computer or PDA. In that regard, the display may also comprise a monitor having a screen, a projector, a television, a computer printer or any other electrical device that is operable to display information. The user input 162 may also include other components such as a mouse. Indeed, devices in accordance with the systems and methods described herein may comprise any device capable of processing instructions and transmitting data to and from humans and other computers including general purpose computers, network computers lacking local storage capability, and set-top boxes for televisions.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various functions of the system and method may be implemented by a single computer having a single processor.

Server 110 may also store server signal data 140, which associates data that identifies a signal with data that identifies a location. By way of example, each cell tower within a particular cell phone system may have a unique number or other identifier that it broadcasts for use by cell phones, in which case the server may store the cell tower's ID, the cell tower's latitude/longitude position and an association between the two in server signal data 140.

A single device may emit multiple signals. By way of example, a WiFi wireless router may broadcast both a MAC address (e.g., a globally unique number such as a hexadecimal number (e.g., 00:23:32:23:51:AD) assigned by the router's manufacturer to the individual router) and an SSID (e.g., a user may change the router's default SSID to a text value such as "JoesPizzaWiFi"). The MAC address and the SSID of the same router may thus be stored as two different signal identifiers. Other wireless base stations and wireless transmitters may broadcast other types of identification information.

A single signal may also be associated with multiple locations. The locations associated with a WiFi signal may include the geographic position of its router and the street address of the building of in which it is contained. The stored locations may also be estimated or actual.

The location of a signal may also represent different properties of the signal, such as the geographic position of its origin or its broadcast range. Accordingly, server signal data 140 may identify the aforementioned router by its MAC address and pair that identification information with a location that identifies the router's broadcast range (e.g., "00:23: 32:23:51:AD—300 m surrounding (37.423021°,−122.083939)"). The server signal data 140 may also separately store and pair the same router's SSID address with the street address of the building containing the router (e.g., "GoogleNet—1600 Amphitheatre Parkway, Mountain View, Calif.").

Locations may be expressed within the system in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic location (e.g., lot and block numbers on survey maps). Moreover, a location may define a range of the foregoing, such as region surrounding a particular geographic position.

The system and method may further translate locations from one reference system to another. For example, the server 110 may access a geocoder to convert a location identified in accordance with one reference system (e.g., a street address) into a location identified in accordance with another reference system (e.g., a latitude/longitude coordinate). In that regard, it will be understood that exchanging or processing locations expressed in one reference system may also be received or processed in other references systems as well.

Server 110 may also store map-related information, at least a portion of which may be transmitted to a client device. For example, the server's data may include map tiles, where each tile is a map image of a particular geographic area. A single tile may cover an entire region such as a state in relatively little detail and another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 110 is capable of selecting, retrieving and transmitting one or more tiles in response to receiving a geographical location from a client device.

Figure 13:
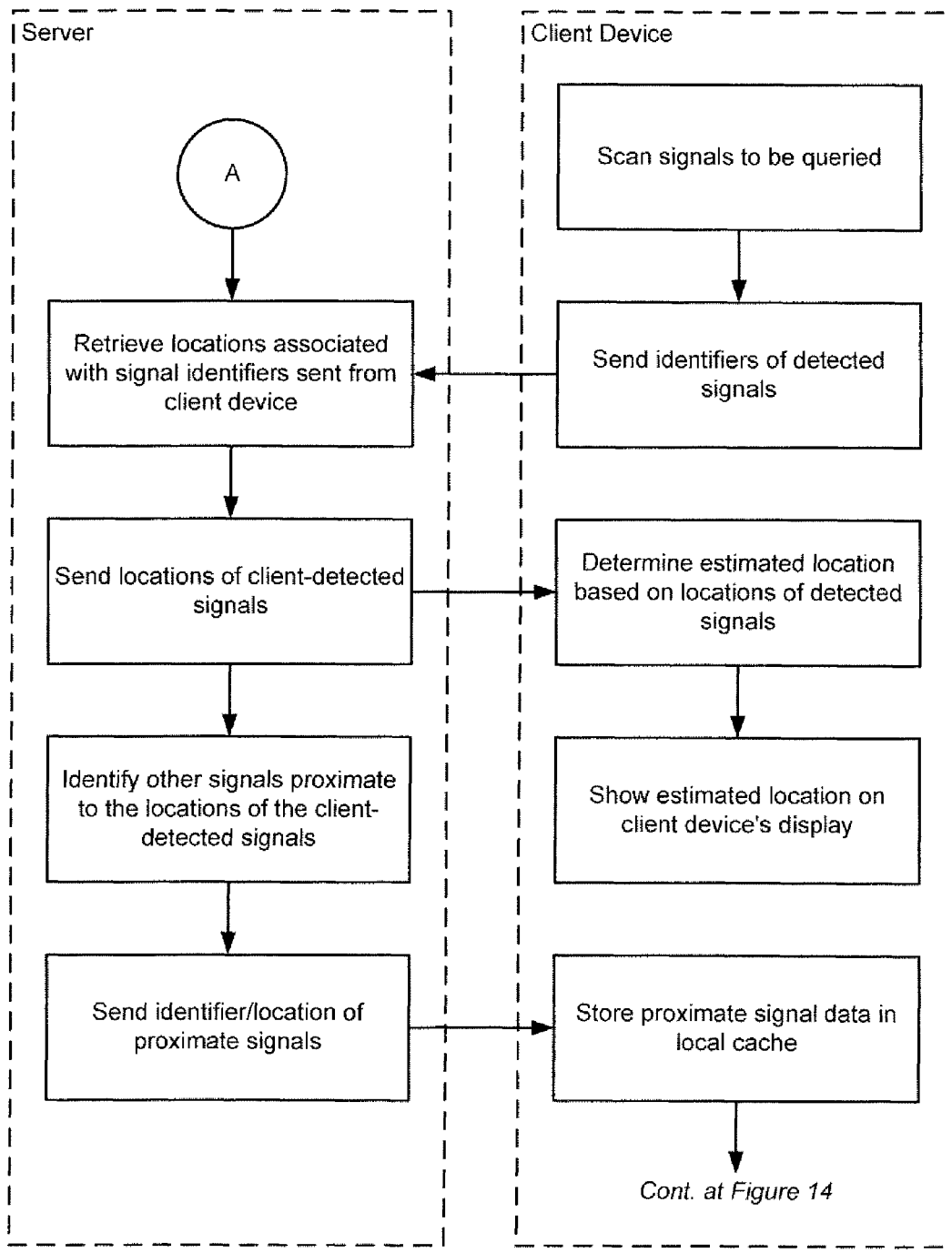
FIG. 13 is a flow chart in accordance with an aspect of the system and method.
Figure 14:
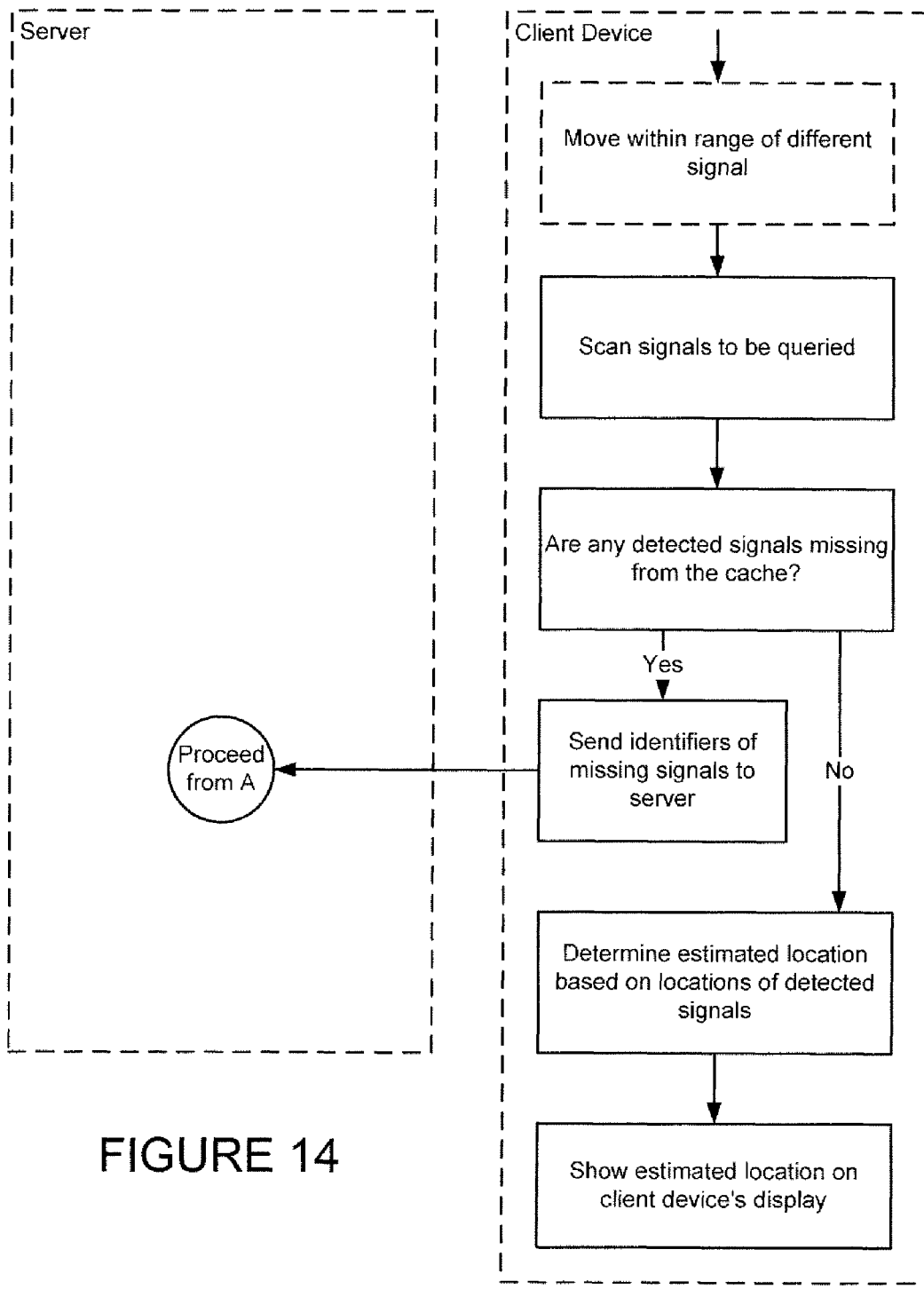
FIG. 14 is a flow chart in accordance with an aspect of the system and method.

In addition to the operations illustrated in FIGS. 13-14 and various operations in accordance with a variety of aspects of the invention will now be described. It should be understood that the following operations do not have to be performed in the precise order described below. Rather, various steps can be handled in reverse order or simultaneously.

It will be further understood that the sample values, types and configurations of data shown in the figures are for the purposes of illustration only. In that regard, systems and methods in accordance with the present invention may include different data values, types and configurations, and may be provided and received at different times (e.g., via different web pages) and by different entities (e.g., some values may be pre-suggested or provided from different sources).

Figure 3:
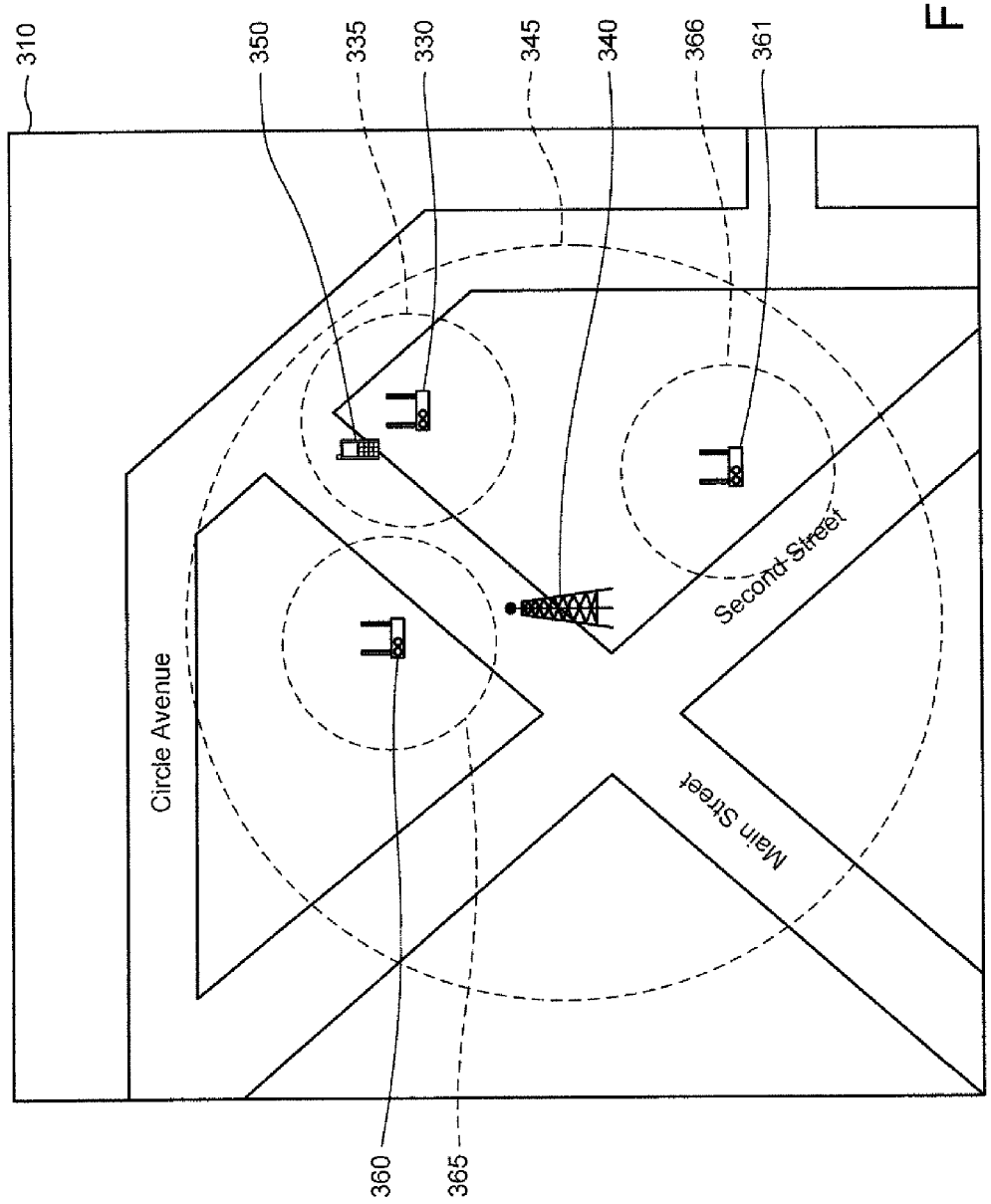
FIG. 3 is an example of potential geographic locations of wireless signals.

As shown in FIG. 3, a client device 350 such as a mobile phone may be able to receive wireless signals from a number of different sources. The client device may be within range 345 of cell tower 340, or within range 335 of a wireless transmitter such as WiFi wireless router 330 or other wireless access point. While there may be other radio signals nearby, such as WiFi wireless routers 360-61, the client device may be out of their ranges 365-66.

The location of the client device may be determined based on the locations of the wireless signals detected by the device. The processor of the phone 350, in accordance with the phone's programming, may thus cause the phone to scan for all radio signals to be queried, e.g., cellular, WiFi and WiMAX signals. The phone may store a list of the identifiers of the detected signals.

The client device may transmit the identities of the detected signals to the server 110 along with a request that the server provide information from which the client device may determine the detected signals' location. Phone 350 may thus transmit the detected signals' identifiers to server 110, such as the ID of cell tower 340 or MAC address of WiFi router 330.

The server uses the signal information provided by the client device to determine the locations of the client-detected signals. In that regard, server 100 may query signal data 140 with the received cell tower ID and MAC address to obtain the latitude/longitude location of cell tower 340 and WiFi router 330.

A processor may then use the locations of the signals to estimate the location of the client device. For example, the server may send the signal locations to the client device and the client device may estimate its own location based on the signal locations sent by the server. The client device's estimated location may be determined in various ways. The processor may simply equate the device's estimated location with the signal's location. If the client device has received multiple signals at its current location, the different locations associated with the signals may be used to estimate the device's location with more precision, such as looking for intersections within the transmission ranges or calculating a centroid based on the various locations. If the client device is able to determine the strength of the signal, and if the processor has access to instructions and data that can be used to estimate a distance from the signal's transmitter, the processor may use this information as well.

Figure 4:
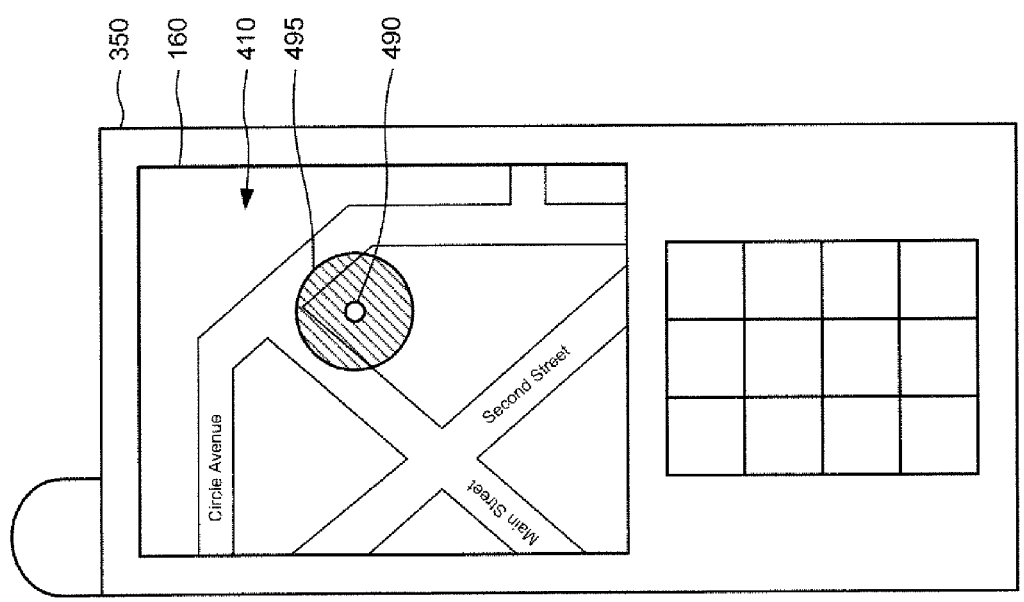
FIG. 4 is a screen shot of a client device in accordance with an aspect of the system and method.

The client device may further display a map based on its estimated location. As shown in FIG. 4, the phone may display a map 410 on display 160 along with an indication 490 of the estimated location. The map may also show the location of the signal along with an indication of the estimated range 495 of the signal.

The server may also send signal locations to the client device even if the device has not yet identified the signals to the server. In one aspect, the server may select signals that are deemed to have a sufficient likelihood of being encountered by the device when it changes locations.

Figure 5:
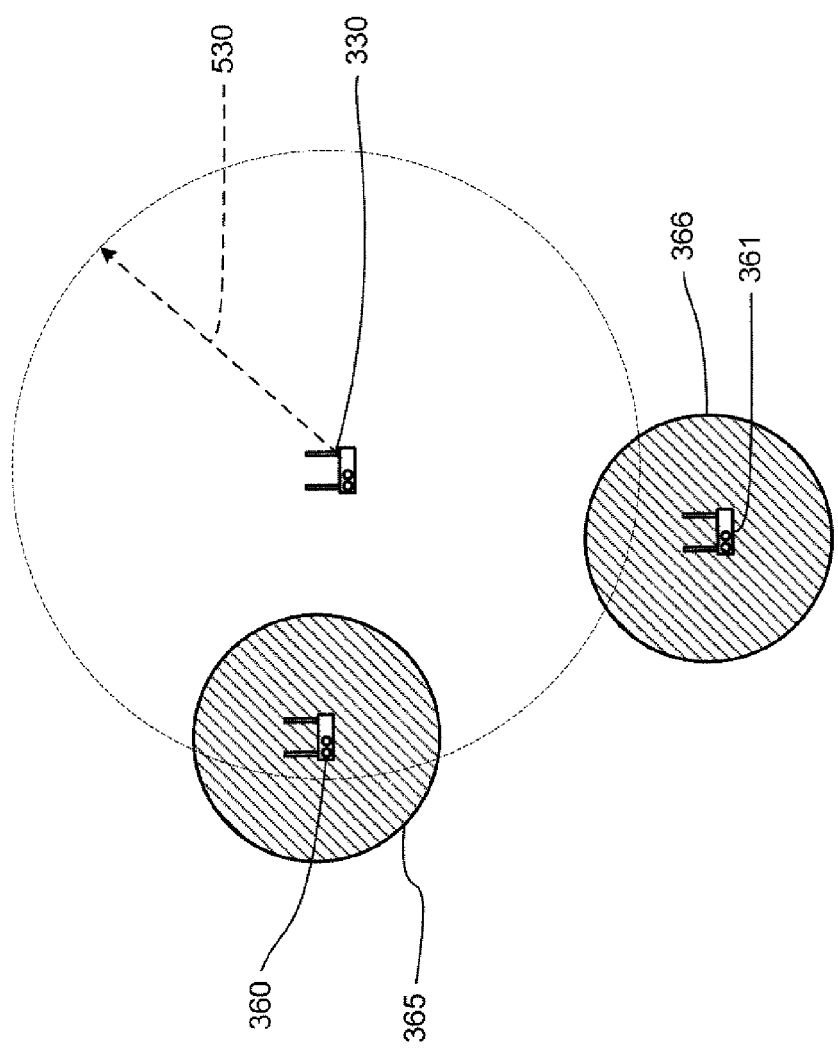
FIG. 5 is an example of selecting signals in accordance with an aspect of the system and method.

In one aspect, the server selects all signals that are proximate to the client device's then-current estimated location and adds the signals to a list to be sent to the client device (hereafter, the "pre-fetch list"). For example and as shown in FIG. 5, the server may have estimated the device's location to be equivalent to the location of the WiFi router 330. As a result, the server may query the signal data 140 for all signals transmitted from base stations that are within a threshold distance 530 of the location of the WiFi router 330. The geographic location of wireless router 360 falls within that distance, but the wireless router 361 does not. As a result, the server may send the location of router 360 to the device in response to receiving the identification of router 330, but not router 361.

The foregoing threshold distance may be set in accordance with various systems and methods. For example, the threshold may be a fixed value. It may also be dynamically calculated based on the client's status or history, e.g., based on the client's recent mobility (such as how fast the client is moving) in combination with the semantics of the location (such as whether the client is at a home/office, or transiting between destinations).

A variety of systems and methods may be used to determine which signal data should be added to the pre-fetch list. For example, rather than pre-fetching all signal locations that are proximate to the client device's estimated location, the server may pre-fetch all signal locations that are proximate to the location of detected signals.

Yet further, if the ranges 365-66 of the signals are known, the server may select any signal range that falls within the distance 530 rather than the position of the signal's transmitter.

Yet further, the pre-fetched signals may be selected based on data specific to the client device. For example, the faster the client device is estimated to be traveling, the greater the distance 530 that may be used by the server to select pre-fetched signals. Moreover, if the client device is known to be traveling in a particular direction, the server may select only signal locations that are in the general direction of the device.

Figure 6:
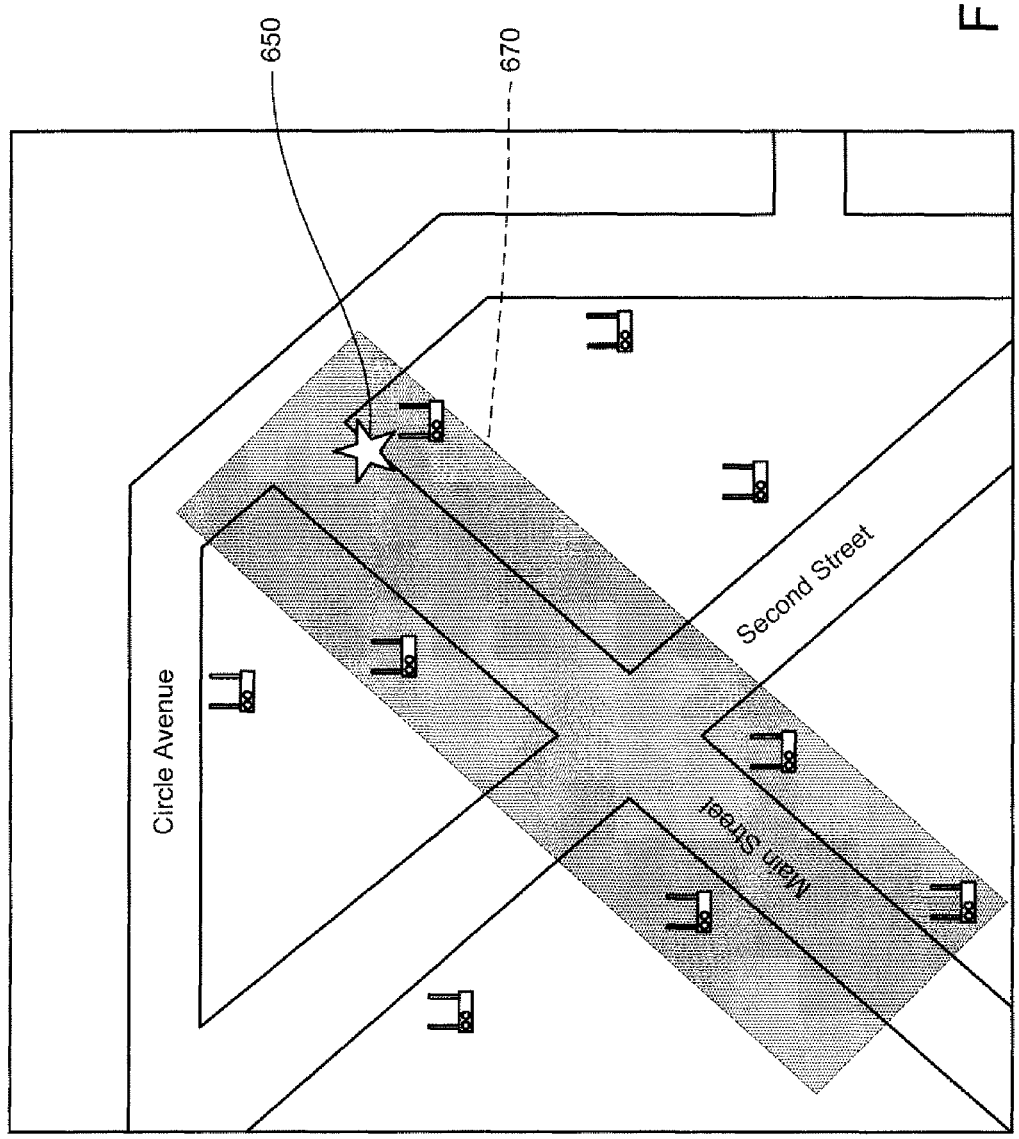
FIG. 6 is an example of selecting signals in accordance with an aspect of the system and method.

The pre-fetched signals may also be selected based on criteria other than the distance between the device's current location and the detected signal's location. As shown in FIG. 6, if the client device is estimated to be at a location 650 that is on Main Street, the system may pre-fetch those signals from routers 670 that are proximate to Main Street, e.g., are located in buildings having a Main Street address or are located at latitude/longitude positions that are within a threshold distance of any vector(s) defining Main Street.

Figure 7:
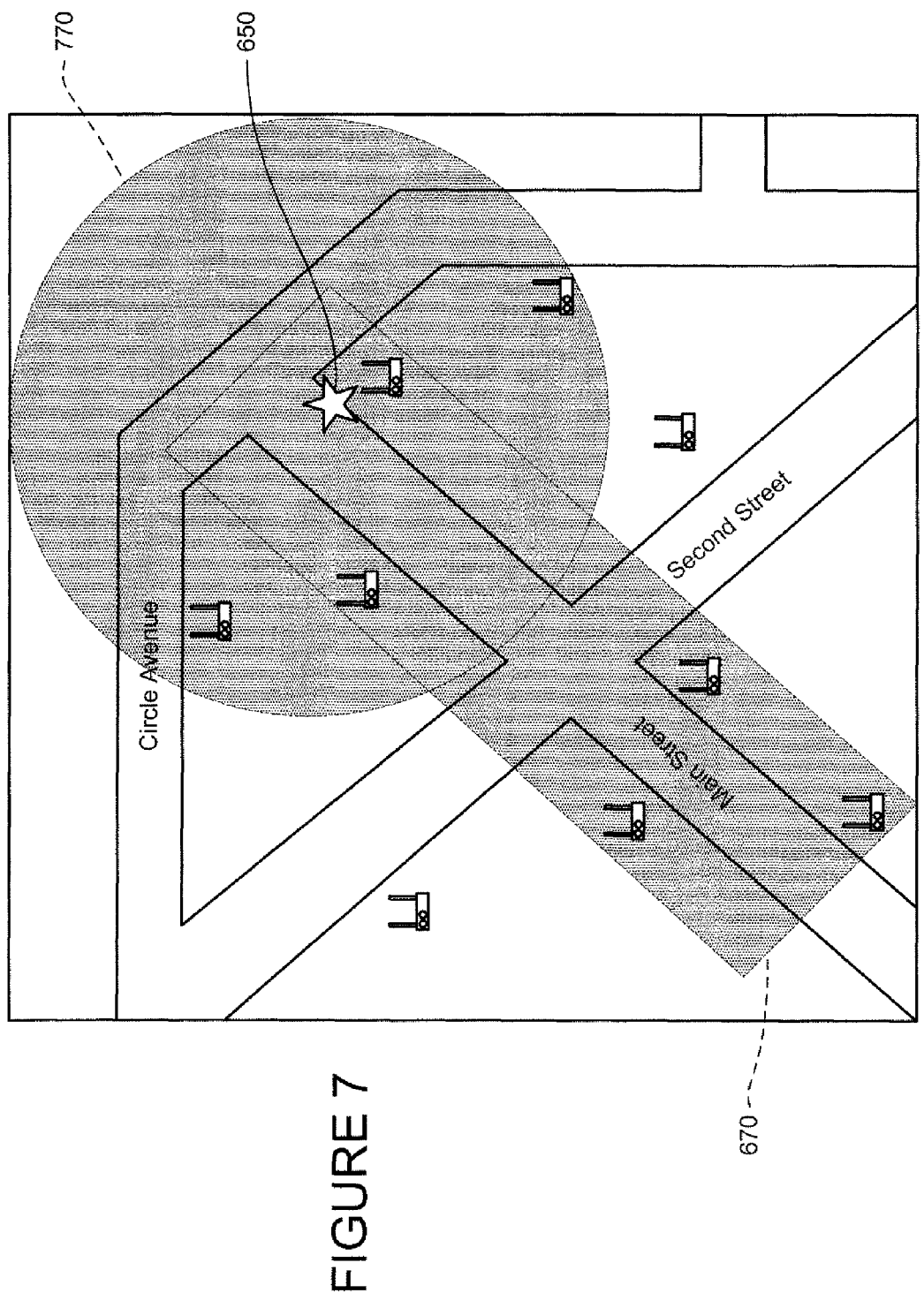
FIG. 7 is an example of selecting signals in accordance with an aspect of the system and method.
Figure 8:
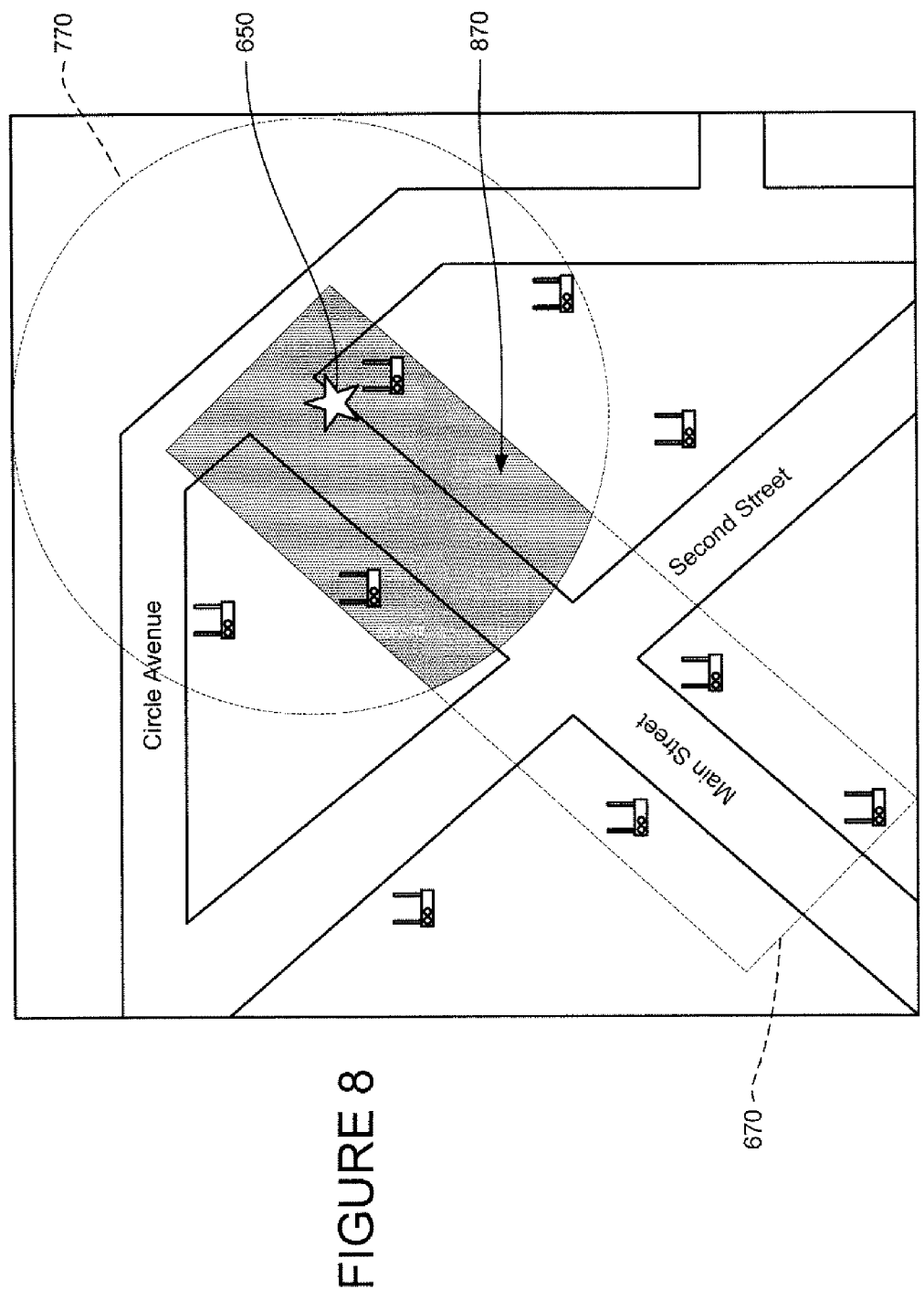
FIG. 8 is an example of selecting signals in accordance with an aspect of the system and method.

The pre-fetched signals may further be selected based on a combination of various criteria. As shown in FIG. 7, the server may preemptively provide the client device with the location data of both any signal that is within a particular distance of the client device's estimated location (e.g., the WiFi routers within reference 770) and any signal along the same street (e.g., the WiFi routers within reference 670). As shown in FIG. 8, the server may alternatively provide the client device with the location of signals that are both within a particular distance of, and on the same street as, the estimated location 650 (e.g., the WiFi routers within shaded region 870).

Still further, the processor may select the pre-fetched signals by first selecting the signals based on their distance to the client device's estimated location. The processor may then assign a priority value to each of the selected signals based on a function that applies different weights to different criteria. For instance, half of the priority value may be based on the signal's distance from the estimated location, and a quarter of the value may be based on whether the signal is on the same street as the estimated location. The processor may then rank the signals based on their value, and add a predetermined number of the highest-ranked signals to the pre-fetch list, or select all signals having priority values that exceed a threshold.

The server then sends an identification of the pre-fetched signals along with signal's locations to the client device.

Server 110 may thus transmit signal data associated with each router within the shaded region of FIG. 7.

The client device stores the pre-fetched signal information in a memory. A phone may store the pre-fetched signal information in the RAM contained within the phone such that the stored information functions as a local database of signal identifier/location data.

Figure 9:
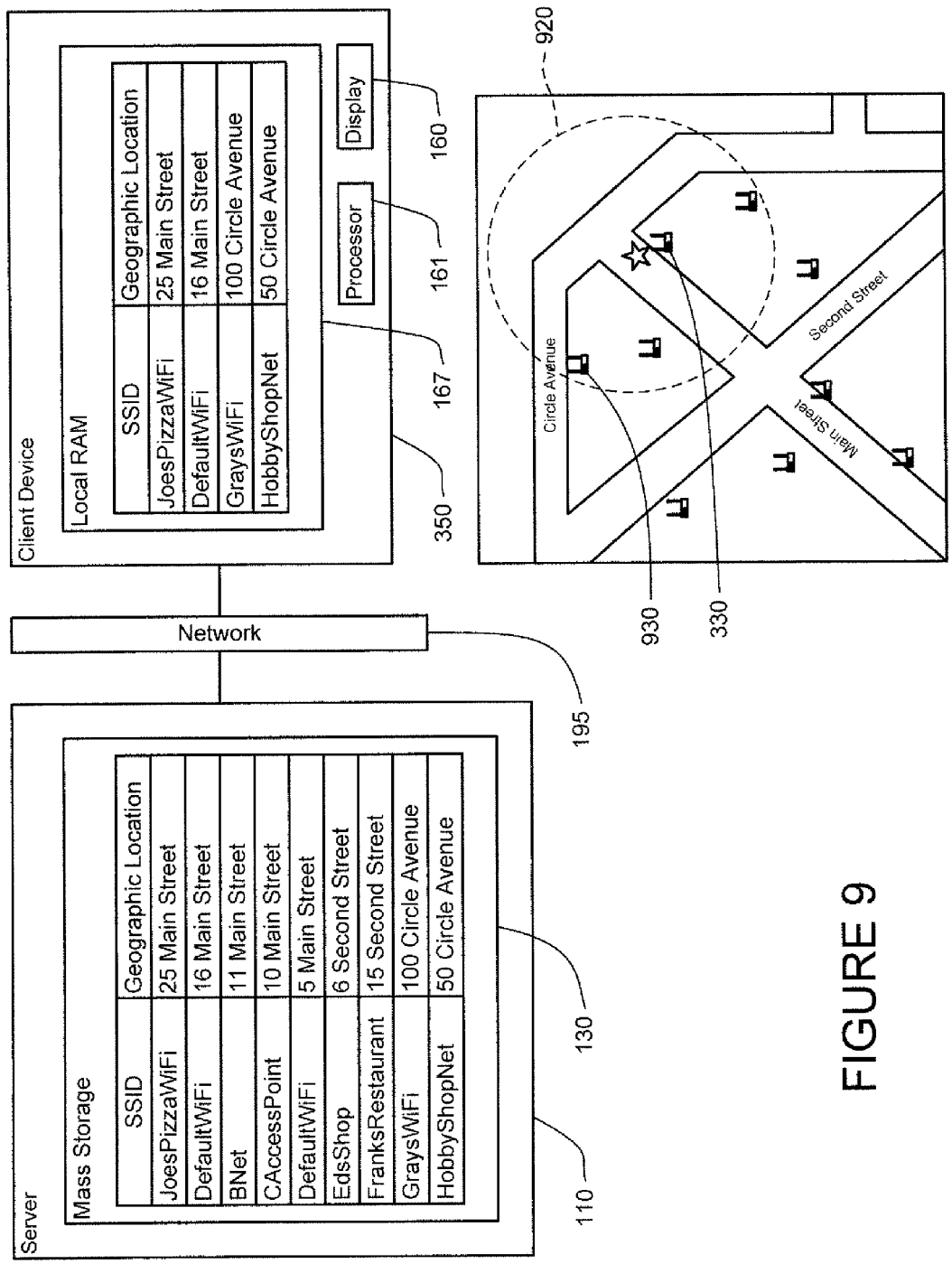
FIG. 9 is a functional diagram of data in accordance with an aspect of the system and method.

FIG. 9 diagrammatically illustrates signal data that may be stored within the memory of both server 110 and phone 350 after the phone transmitted a request for signal information to the server. (For ease of illustration, FIG. 9 uses WiFi signals that are identified by their SSID name and the locations are defined by street address, it being noted that SSID names are prone to change and the data associated with street addresses may be less accurate than latitude/longitude positions.) FIG. 9 assumes that the phone 350 was within the range of a single WiFi router 330, detected the SSID ("JoesPizzaWifi") transmitted by router 330, sent the SSID to server 110, and received the location of router 330 (e.g., "25 Main Street") from server 110 in response. Phone 350 also received pre-fetched signal data from server 110, namely, the SSID and street address of all WiFi routers known to be within a particular distance 920 of the router 330. The phone stored the signal data received from the server 110 in the RAM 167 contained within the phone's housing.

The client device of FIG. 9 thus stores a local copy of a portion of the signal data stored in the mass storage of server 110.

When the client device moves within the range of a newly-detected signal, the location of the device may be calculated by first accessing the pre-fetched signal data for matching information. For example, if phone 350 moved out of the range WiFi router 330 and into the range of WiFi router 930, the phone may detect the SSID ("HobbyStoreNet") of router 930. Rather than transmitting the SSID to the server over network 195, the phone's processor 161 first queries local memory 167. If a matching SSID ("HobbyStoreNet") and its location ("50 Circle Avenue") are stored in the local memory 167, the processor will determine the location of the phone based on the pre-fetched data. If not, the processor will request the information from server 110 via network 195.

In another aspect, the client device will periodically compare a list of the signals it detects against the list of locally-stored pre-fetched signals. If a detected signal has not been pre-fetched, the client device may use the identity of the detected signal to query the server and obtain its location (and may also obtain even more pre-fetched signals in response).

The memory containing the pre-fetched signal data may be chosen so that the client device's processor can typically determine the location of a pre-fetched signal faster by accessing that memory than by querying the server or another memory.

Figure 10:
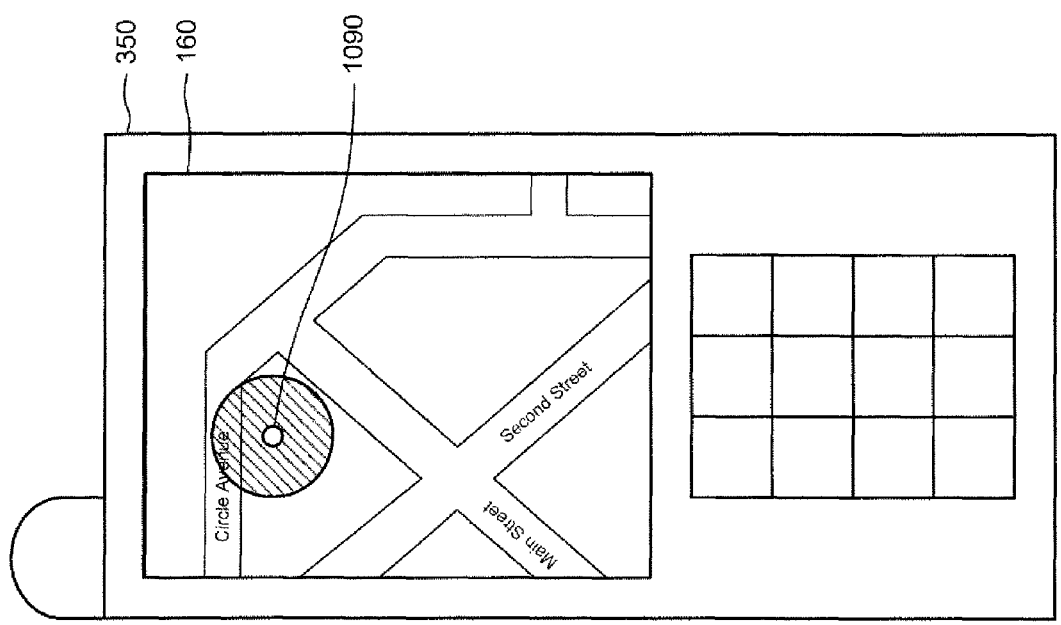
FIG. 10 is a screen shot of a client device in accordance with an aspect of the system and method.

As shown in FIG. 10, the client device may accordingly display the position 1090 of the device relative to a second signal without ever sending the second signal's identity to the server that stores the second signal's location.

The system may secure the pre-fetched signal data so that the location of a pre-fetched signal cannot be easily obtained unless the client device is in the presence of the signal.

Figure 11:
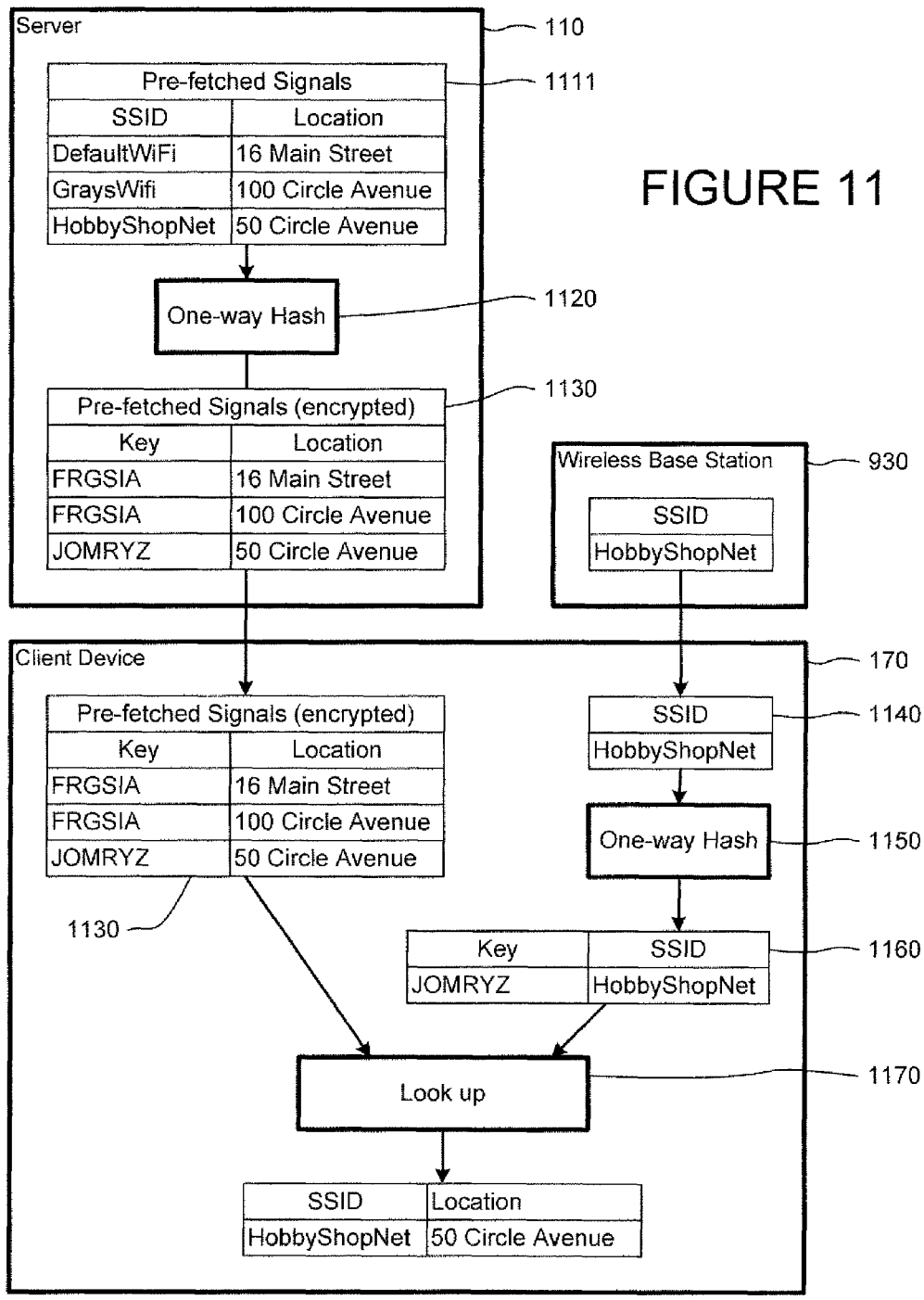
FIG. 11 is a functional diagram of data in accordance with an aspect of the system and method.

In one aspect and as shown in the flowchart of FIG. 11, server 110 transmits pairs of values to the client device, wherein one value of a pair represents the location of a pre-fetched signal and the other value of the pair is based on—but not identical to—the identification of the pre-fetched signal. For example, before the server transmits the pre-fetched signals 1111, the server's processor may use a routine 1120 to encrypt the SSID of the signals.

The signal identifiers may be encrypted in accordance with various systems and methods. One encryption implementation may comprise a routine such that, even if the routine's output value and every step of the routine is known, it is effectively impossible or at least computationally difficult to determine the routine's input value.

For example, server may process the SSID of the signals in accordance with a one-way cryptographic hash such as SHA-1. Each resulting hashed SSID values 1130 may be paired with an SSIDs' location, such as hashing "HobbyShopNet" and associating the hash value "JOMRYZ" with the signal's location at "50 Circle Avenue." The encrypted signal information may then be sent to the client device 170.

The client device may similarly encrypt the signals that it receives. As shown in FIG. 11, when the client device receives a WiFi signal 1140 from wireless base station 930, it may use the same hashing function 1150 as the server's hashing function 1120 to obtain a hash value 1160 from the detected SSID.

The client device may then compare the encrypted value that it created from the detected signal with the encrypted values that it obtained from the server. If a match is found, the client device may use the associated pre-fetched location to determine the device's position. For example, the hash values 1130 of the pre-fetched signals may be considered keys in a look-up table. Client device 170 may use a lookup function 1170 to compare the key 1160 that it computed with the keys contained in the pre-fetched signal data 1130. In that regard, the client device will determine that the client-computed key 1160 ("JOMRYZ") is associated with the location "50 Circle Avenue" in the pre-fetched data 1130.

Once the locations of the detected signals are retrieved from the pre-fetched data 1130, the client device may compute and display its estimated location as described above.

As a result, the server provides the client device with enough data for it to determine the location of neighboring signals without making another request to the server. This may allow client-side applications to avoid some round-trip communications with the server (and potentially save battery power, bandwidth and time).

However, it may also provide the data in way that makes it very difficult for one to determine the location of the neighboring signals without being physically proximate to the signal's location. If the pre-fetched signal data is not secured, some entities may attempt to trick the server into divulging large portions of its signal data 140 by sending data that pretends to be a phone at a particular location. If the signal data is secured as described above, the entity may still receive the locations of signals but it will not know the identities of those signals. Thus, in order for a unauthorized program to use the data sent by the server, the program may require access to an unencrypted signal, which—in at least some implementations—may only be obtained by a program in communication with a device that is physically near the signal. Moreover, in another aspect, the pre-fetched locations may be encrypted as well.

One of the advantages of the invention is its ability to accommodate a wide variety of alternatives and additions to the foregoing features.

As noted above, the signal identifiers stored by the server and detected by the client device may comprise information that is broadcast by a radio transmitter (e.g., a base station) for the express purpose of uniquely identifying the transmitter (e.g., a cell tower's ID or the MAC address of a WiFi transmitter).

However, other information associated with a radio signal may also be used to identify the radio signal even if the information was not intended for that purpose. By way of example, if the fluctuations of a particular radio signal are relatively consistent and different from other radio signals, the fluctuations may be used as the radio's identifier.

In that regard and in some aspects, the pre-fetched signal identifier and the detected signal identifier need not match perfectly in order for the client device to determine its location based on the location that was received with the pre-fetched identifier. Rather, the pre-fetched location may be used when the received identifier corresponds with the detected identifier, e.g., the differences between the received identifier and the detected identifier are sufficiently small to use the pre-fetched location.

Instead of relying solely on a signal having a fixed broadcast location, such as a cell tower, a mobile device may also detect and identify a signal provided by another mobile device. For instance, a first mobile device may detect a Bluetooth signal broadcast by a second mobile device and provide the identifier to the server. The then-current or relatively-recent location of the second device may be known to the server. For example, the second device may have transmitted its latitude/longitude position to the server based on a GPS component, transmitted signal identifiers to the server from which the server determined the second device's location as described above, or otherwise provided information from which the server was able to determine the second device's location. The server may use the second device's location to thus compute the location of the first device. The server may also provide the second device's location to the first device, either in response to receiving the second device's identifier or as pre-fetched data. Further, the location of the second device may be intentionally degraded before sending to the first device in order to protect the location privacy of the second device.

The absence of an expected signal may also be used to estimate the device's location. By way of example, the signal data stored at the server may indicate whether signals overlap or neighbor one another. As a result, if the client device detects three neighboring signals but not a fourth, the absence of the fourth signal may assist the client device in determining its position.

The client device may alternatively transmit other information—such as a sample of the signal—from which the server may determine the identity of the signal.

Moreover, while radio signals may provide particular advantages in various circumstances, a signal may comprise other types of information that is detectable at some locations but not others. By way of example, other signals may include audio information (e.g., ambient noise on a street corner, where the signal is identified by the audio data captured by a microphone) and visual information (e.g., scenery visible from a latitude/longitude position, where the signal identifier is stored as a JPEG file taken by a camera at that latitude/longitude position).

Other signals may also be used to secure the pre-fetched signal data. As noted above, the server may send the client device a value/location pair where the location represents a signal's location and the value was determined by hashing the signal's identifier. But rather than encrypting each signal in the pre-fetched data based on the signal's identifier, the encryption may rely on other signals as well. In that regard, signal data may be encrypted in accordance with the following function $f$:

$$K_{S1}=f(S1,S2)$$

where:
S1=signal data that is associated with a first signal;
S2=signal data that is associated with a second signal, where the location of the second signal overlaps with the location of the first signal; and
$K_{S1}$=key of the first signal, where the key is transmitted to the client device along with the location of the first signal, or where the key is computed by the client device when in the presence of the first signal.

If a location is within the transmission range of multiple WiFi base stations, all of the detected WiFi signals may be used to compute the key. The processors of the server and client device may compute the key by executing computer instructions in accordance with the function.

Figure 12:
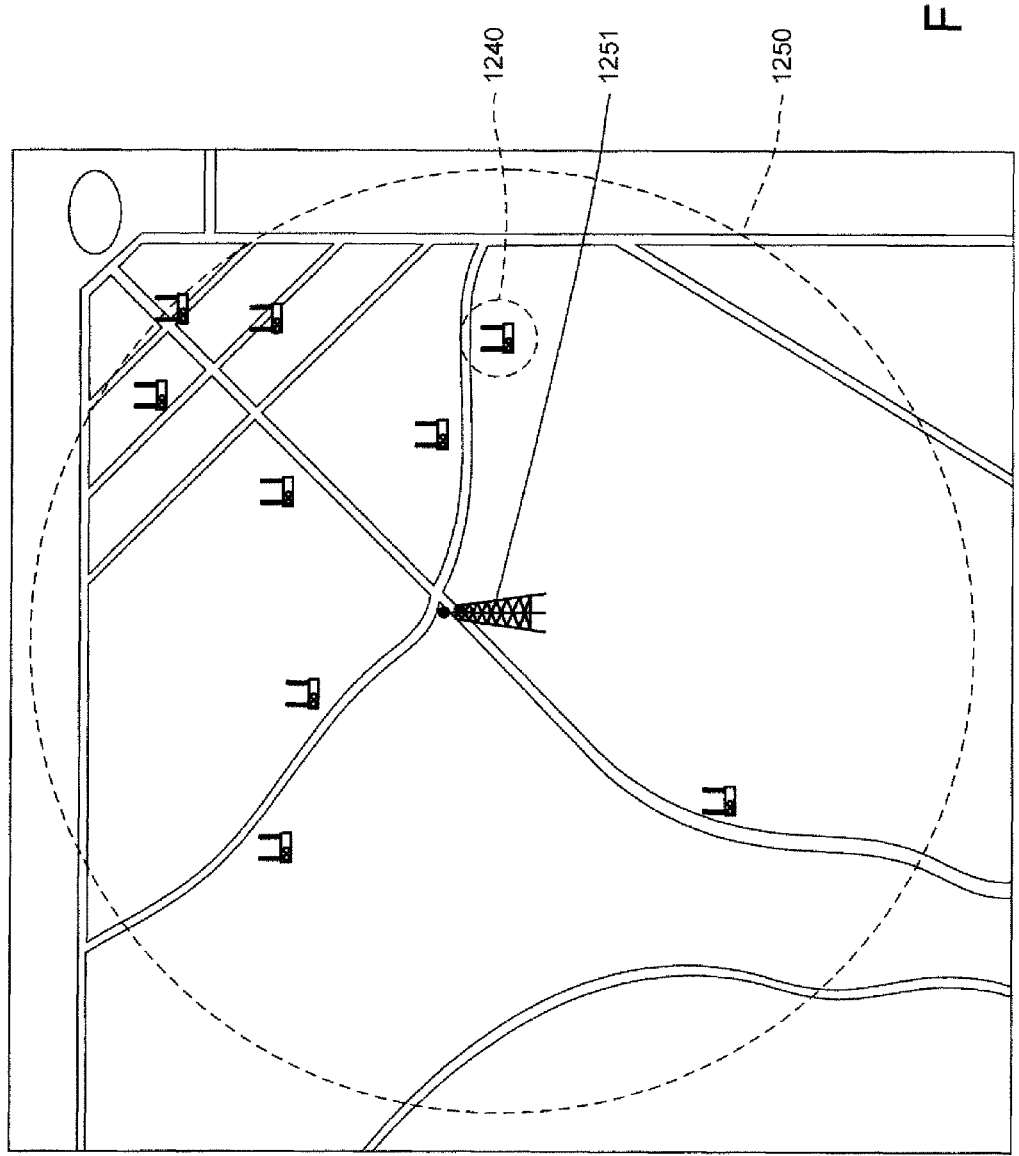
FIG. 12 is an example of potential geographic locations of wireless signals.

FIG. 12 provides an example of using two different and independently-transmitted signals to compute a key that will be associated with the location of a single signal. As shown in FIG. 12, anyone within the presence of WiFi signal 1240 may also be within the listening range 1250 of FM radio station transmitter 1251. Accordingly, to provide another layer of security, the key of the pre-fetched WiFi signal may be computed based on both the SSID of the WiFi signal and the identification information contained in the FM radio signal.

In another aspect, assuming the ranges of two independently-transmitted signals S1 and S2 partially overlap, the server may provide three different key/location pairs: (1) the pair L1/$K_{L1}$ where $K_{L1}$=$f$(S1) when only signal S1 is detected and L1 is the location of signal S1, (2) the pair L2/$K_{L2}$ where $K_{L2}$=$f$(S2) when only signal S2 is detected and L2 is the location of signal S2, and (3) the pair Li/$K_{Li}$ where $K_{Li}$=$f$(S1, S2) when both signals S1 and S2 are detected and Li is a location lying within the intersection of the ranges of S1 and S2.

Moreover, as the distance of the device from a particular location increases, the difficulty of a user guessing the data behind the pre-fetched data may increase as well. For instance, if the key is based on a set of radio signals unique to a given location, a "scraper" may have to try various different permutations in order to "guess" the correct sequence. As the distance increases and less signals are detected, the number of permutations that may need to be tried may increase as well (potentially exponentially).

The foregoing function ($f$) may comprise a context fingerprinting function based on context information, i.e., a function that computes a key using data that is detectable when the means of detection is at a particular location but may not be detectable when the means of detection is at another location. Such context information may include not only radio signals as described above, but also audio signals (e.g., ambient noise at a particular location as measured by a mobile phone's microphones) and visual signals (e.g., images of surrounding captured by a mobile phone's camera).

Yet another level of security may be implemented by using non-location specific data. The context fingerprinting function ($f$) may be defined as follows:

$$K_L=f(S,C)$$

where:
K=key transmitted to client device as pre-fetched data or computed by client device;
L=a location;
S=signal data that is associated with location L (e.g., whether the data is obtained from a single signal or multiple signals);
C=data having a value independent of location L;
$K_L$=key associated with location L.

The location-independent parameter may comprise a value that is exchanged between the server and client device. By way of example, the function may comprise:

$K_L$=SHA-1 ($S$,nonce)

where:

SHA-1=a function consistent with the SHA-1 algorithm;

nonce=a constant (e.g., a random large number) provided by the server for use by the client device when calculating keys for comparison with the keys provided by the server.

The nonce may be changed from time to time. By way of example, the same nonce may be used and transmitted to all client devices for a year. On the other hand, a different nonce may be sent for each key. Changing the nonce may help ensure that the user is actually present at the given location, rather than pretending to be present at the location by collecting radio signals using other clients or some other offline process (e.g., wardriving).

The function may also be configured so as to tolerate or encourage collisions of key data. By way of example, the hashing function may be adjusted to increase or decrease the likelihood that two different signals will yield the same hash value (such as by increasing/decreasing the byte length of the hash value). This can be beneficial with respect to security, e.g., the more collisions there are, the harder it will be for a malicious user to reverse engineer the identifiers or meaningfully use the encrypted data by aggregating it from multiple sources. However, it may also result in collisions at the client device, and thus make it difficult for a client device to determine which of the two (or more) locations associated with the identical key is the correct location. However, the function can be adjusted so that collisions are unlikely to affect the client devices. For example, assume that the odds of two different signals at two different locations having the same key is 1:500. If the average client device keeps a cache of 10 pre-fetched locations, it is highly unlikely (less than 10%) that the cache will contain two of the same keys. (An increased distance between the client device and the signal locations may increase the probability of a collision if the client device increases the size of its cache to hold a larger number of signals.) Moreover, the repeated keys will only make a difference if the client device is in the presence of one of the signals represented by the repeated key.

In addition to encrypting the identifiers of the pre-fetched signals, the system may further encrypt the location of the pre-fetched signals as well.

The system and method may be particularly advantageous when used in connection with displaying a map on a device's display that moves as the device moves. However, the system and method may also be used in connection with other applications that rely on the device's location, such as programs that authenticate data requests and transmissions based on the current location of the device. Programs such as location-based search, or third-party applications that take advantage of reliable location information to provide a better user experience, may also rely on the features described herein.

In other aspects, functions described above as being performed by the server may be performed by the client device, and vice versa. For example, the server may compute and transmit the client device's estimated location to the client device.

In still another aspect, the client device may use the pre-fetched location data until it receives ostensibly more precise location data from the server. For example, a client device may send simultaneously-detected signals S1, S2 and S3 and their associated signal strengths to the server. The server may respond with a single location L as well as the pre-fetched identifiers and locations of nearby signals (e.g., S4/L4, S5/L5, S6/L6). When the client device actually detects S4, the client device may initially compute its own location as L4 and display a map accordingly. However, if and after the client device transmits the signal S4 and its signal strength to the server, the server may also calculate a location (e.g., L4') that is more accurate because of the greater computational power or data available to the server. Once the revised location is calculated, the server may send the revised location to the client device whereupon the client device updates its location accordingly (e.g., from L4 to L4')—and provided the detected signal information sent to server has not changed. As noted above, the server may further send the identifiers and location of the signals near S4 (e.g., S7/L7, S8/L8, S9/L9).

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method comprising:

detecting a first signal at a device when the device is at a first location;

receiving, based on an identifier of the first signal, second signal data and a second location associated with the second signal data;

detecting another signal at the device, wherein said another signal is detected in response to the device being moved from the first location to another location;

comparing the second signal data with data based on an identifier of said another signal;

determining a device location associated with the device based on the comparison;

displaying, on an electronic display associated with the device, information based on the determined device location.

2. The method of claim 1 wherein the first signal and said another signal are transmitted by WiFi transmitters.

3. The method of claim 2 wherein the identifier of the first signal and the data based on the identifier of said another signal is each a MAC address.

4. The method of claim 1 wherein said determining a device location comprises determining whether the data based on an identifier of said another signal matches the second signal data, and determining the device location based on the second location when there is a match.

5. The method of claim 1 wherein said determining a device location comprises selecting the second location as the device location.

6. The method of claim 1 further comprising receiving third and fourth signal data, and receiving third and fourth locations respectively associated with the third and fourth signal data; and wherein said comparing further comprises comparing the data based on an identifier of said another signal with the second, third and fourth signal data, and said determining comprises selecting the second, third or fourth location depending on whether the identifier matches the second, third or fourth signal data.

7. The method of claim 1 wherein the device cannot detect the first signal when the device is at said another location.

8. The method of claim 1 further comprising detecting a plurality of signals when the device moves from the first location to another location, and wherein determining the device location comprises determining the location based on each of the plurality of signals.

9. The method of claim 1 further comprising receiving a plurality of locations based on the identifier of the first signal data, associating each one of a plurality of the detected signals with one of the plurality of received locations, and wherein the device location is determined based on a plurality of the received locations.

10. The method of claim 1 further comprising receiving, based on an identifier of the first signal, a single location associated with a plurality of identifiers of independently-transmitted signals, where each signal is at a different location; further comprising detecting a plurality of signals at the device when the device moves from the first location to another location; and wherein said comparing comprises comparing the received identifiers with the detected signals.

11. The method of claim 1 further comprising calculating a value based on the identifier of the signal, wherein the value is based on an encryption function.

12. The method of claim 11 wherein the encryption function comprises a one-way cryptographic hash function.

13. The method of claim 12 wherein the one-way cryptographic hash function comprises SHA-1.

14. The method of claim 1 wherein the received locations are encrypted.

15. The method of claim 1 wherein the device location is displayed relative to a map displayed on the electronic display.

16. A method comprising:
receiving, via a network and from a device, a first identifier of a radio signal;
selecting, with a processor and based on the first identifier, a first location from identifier/location data, said identifier/location data comprising a plurality of locations each associated with an identifier of a radio signal;
selecting additional locations and their associated identifiers from the identifier/location data based on each location's proximity to the first location; and
providing, via the network and to the device, the first location, the additional identifiers and the locations associated with the additional identifiers without waiting to receive said additional identifiers from the device.

17. The method of claim 16 wherein selecting locations based on proximity comprises selecting locations that are less than a threshold distance from the first location.

18. The method of claim 16 wherein the first location is proximate to a street, and wherein selecting locations based on proximity comprises selecting locations that are proximate to the same street.

19. The method of claim 16 wherein selecting locations based on proximity comprises selecting locations based on the direction in which the device is moving.

20. The method of claim 16 wherein selecting locations based on proximity comprises selecting locations based on the speed in which the device is moving.

21. A method comprising:
detecting a first signal identifier at a device when the device is at a first location;
receiving, based on the first signal identifier, a second value and a second location associated with the second value, the second value being based on an identifier of a second signal;
detecting another signal identifier at the device when the device moves from the first location to another location;
calculating, with a processor, an encrypted value based on a function applied to said another signal identifier;
determining the device's location based on the second location when the encrypted value corresponds with the second value; and
displaying, on an electronic display associated with the device, information based on the determined device location.

22. The method of claim 21 wherein the encryption function is a one-way cryptographic function.

23. The method of claim 22 wherein the encryption function is based on SHA-1.

24. The method of claim 21 wherein the encryption function is a hash function.

25. The method of claim 21 wherein said calculating comprises calculating an encrypted value based on a function that accepts as parameters identifiers from two different signals detected by the device.

26. The method of claim 21 wherein said function further accepts a numerical value as a parameter that is not associated with a detected signal, and the value is received at the device via a network.

27. A device comprising:
a processor;
a display displaying data processed by the processor in accordance with the instructions;
a medium storing instructions operable by the processor;
the instructions comprising:
detecting a first signal at the device when the device is at a first location;
receiving, based on an identifier of the first signal, second signal data and a second location associated with the second signal data;
detecting another signal at the device, wherein said another signal is detected in response to the device being moved from the first location to another location;
comparing the second signal data with data based on an identifier of said another signal;
determining a device location associated with the device based on the comparison; and
displaying, on an electronic display associated with the device, information based on the determined device location.

28. The device of claim 27 wherein the device is a wireless phone.

29. The device of claim 27 wherein the device further comprises a wireless WiFi receiver, and wherein said identifier comprises a MAC address.

30. The device of claim 27 wherein the device further comprises a housing and a memory wherein the processor and memory are stored internally within the housing, and wherein said second signal data and second location are stored within the internal memory.

31. The method of claim 27 wherein the instructions further comprise calculating a value based on the identifier of the signal, wherein the value is based on an encryption function.

32. The method of claim 31 wherein the encryption function comprises a one-way cryptographic hash function.

33. A system comprising:
a first computer at a first node of a network;
the first computer having access to instructions operable by the first computer, identifier data comprising data based on information broadcast by a plurality of radio transmissions, and location data representing geographic locations, wherein the identifier data of each radio transmission is associated with a geographic location;

a mobile client device at a second node of the network different from the first node, the client device comprising an electronic display, a processor and instructions operable by the processor;

the instructions of the client device comprising:
- detecting a first radio transmission when the device is within range of the first radio transmission;
- providing, to the first computer, first identifier data based on the first radio transmission;
- receiving, from the first computer and in response to the first identifier data, first location data representing a first geographic location;
- receiving, from the first computer and in response to the first identifier data, second location data representing a second geographic location different from the first geographic location and second identifier data;
- detecting a second radio transmission when the device is within range of the second radio transmission;
- displaying, on the electronic display, information based on the first geographic location when the device is within range of and detects the first radio transmission; and
- displaying, on the electronic display, information based on the second geographic location when both (i) the device is within range of and detects the second radio transmission and (ii) the second identifier data corresponds with an identifier of the detected second radio transmission;

the instructions of the first computer comprising:
- receiving the first identifier data;
- selecting and providing the first location data based on the location data that is associated with the first identifier data;
- selecting and providing the second location data based on the proximity of the second geographic location to the first geographic location; and
- selecting and providing the second identifier data based on the identifier data that is associated with the second location data.

34. The system of claim 33 wherein the first computer is a server and the client device is a mobile phone.

35. The system of claim 33 wherein the network comprises the Internet and further comprises a wireless network.

36. The system of claim 33 wherein the second identifier data was calculated by applying encryption to the identifier of the second radio transmission; wherein the instructions of the client device further comprise calculating an encrypted value by applying the same encryption to an identifier of the detected second radio transmission; and wherein the second identifier data corresponds with an identifier of the detected second radio transmission when the second identifier data received from the first computer corresponds with the encrypted value calculated by the client device.

37. The system of claim 36 wherein the encryption comprises a one-way cryptographic hash function.

38. The system of claim 33 wherein the instructions of the first computer further comprise determining and providing revised first location data associated with a third geographic location after the first computer provides the first location data to the client device, and wherein the displaying instructions of the client device further comprise displaying, on the electronic display, information based on the third geographic location when the device is within range of and detects the first radio transmission.

39. A computer-usable medium including a program executable by a processor comprising:
- computer code that detects a first signal at a device when the device is at a first location;
- computer code that receives, based on an identifier of the first signal, second signal data and a second location associated with the second signal data;
- computer code that detects another signal at the device, wherein said another signal is detected in response to the device being moved from the first location to another location;
- computer code that compares the second signal data with data based on an identifier of said another signal;
- computer code that determines a device location associated with the device based on the comparison; and
- computer code displays, on an electronic display associated with the device, information based on the determined device location.

* * * * *